Aug. 28, 1923.

W. B. HASKINS

TROLLEY SAFETY CLUTCH

Filed Aug. 13, 1921

1,466,375

INVENTOR
*William B. Haskins*
BY
*Wm. F. Davis.*
ATTORNEY

Patented Aug. 28, 1923.

1,466,375

UNITED STATES PATENT OFFICE.

WILLIAM B. HASKINS, OF INDEPENDENCE, MISSOURI.

TROLLEY SAFETY CLUTCH.

Application filed August 13, 1921. Serial No. 491,927.

*To all whom it may concern:*

Be it known that I, WILLIAM B. HASKINS, a citizen of the United States, residing at Independence, in the county of Jackson and State of Missouri, have invented certain new and useful Improvements in Trolley Safety Clutches, of which the following is a full, clear, and exact description, such as will enable others skilled in the art to which it appertains to make and use the same.

The invention relates to a safety clutch for the trolleys of electric cable propelled cars to arrest the upward thrust of the trolley when it accidentally leaves the trolley wire so that the trolley will not become enmeshed in the usual overhead wires and injure the wires or trolley, or both.

The usual trolley is thrust upwardly against the trolley wire with such force that the entire trolley has been known to be torn from the car by the trolley leaving the wire. The more frequent difficulty, however, is experienced by contact of the trolley with the usual wiring, sometimes breaking the wire and sometimes breaking the trolley.

It is essential that a safety clutch be provided that will play out and take up rope as the trolley raises and lowers to the uneven height of the trolley wire and that any sudden rise of the trolley as when it leaves the trolley wire will immediately arrest the upward movement of the trolley before it can raise to a height that will contact with the overhead wires.

The present invention has provided a trolley safety clutch that will allow the trolley to follow the uneven height of the trolley wire and that will when the trolley leaves the trolley wire immediately arrest the upward movement of the trolley and prevent damage of the trolley and overhead wires.

With these and other objects in view, the invention consists in the features of construction, combinations and arrangement of parts hereinafter set forth and more particularly pointed out in the appended claims, the accompanying drawings illustrating a safety trolley clutch embodying the features of the invention.

In the drawings:—

Figures 2, 3:
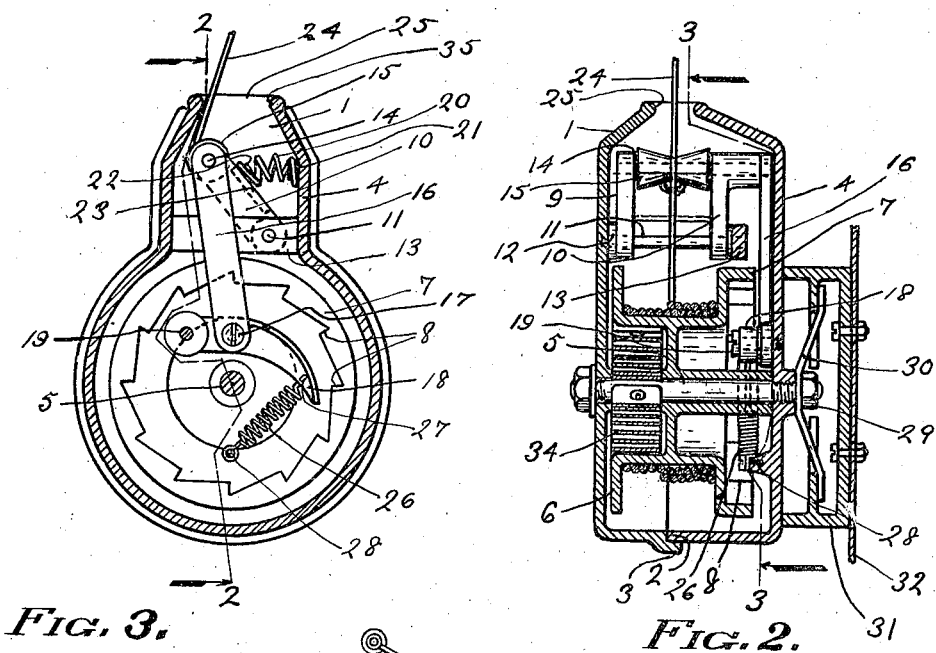
Fig. 2 is an enlarged sectional view taken on line 2—2 of Fig. 3.
Fig. 3 is an enlarged sectional view taken on line 3—3 of Fig. 2.
Figure 1:
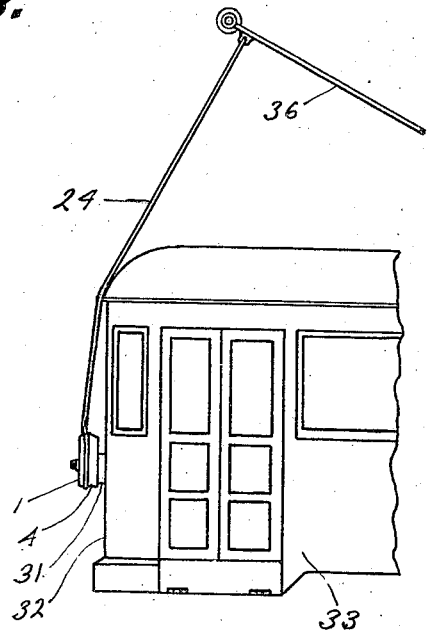
Fig. 1 is a fragmentary view of an electric car with the improved safety clutch attached.

The casing 1 is provided with the shoulder 2 and flange 3, and the casing No. 4 rests against the shoulder and within the flange forming a housing, the members being secured rigidly together by the stud bolt 5.

Upon the stud bolt 5 is revolubly mounted the winding drum 6 which is provided with the annular flange 7, which in turn is provided with the integral internal ratchet teeth 8.

The arms 9 and 10 are pivotally connected by the pivot pin 11 to the boss 12 within the casing member 1 and the cross bar 13 within the casing member 4, the opposite end of the arms being connected by the pin 14, on which the pulley 15 is revolubly mounted and from which the connecting bar 16 connects by the screw 17 to the ratchet pawl 18 pivoted to the casing member 4 by the screw 19.

The arms 9 and 10 are normally maintained in the position shown in Fig. 3, by the compression spring 20 which is seated around the pin 21 extending from the casing members 1 and 4 and the pin 22 extending from the cross bar 23, the latter connecting the arms as shown.

The rope 24 is wound on the winding drum 6 and passes under and partly around the pulley 15 and out through the opening 25 formed in the casing members 1 and 4.

The ratchet pawl 18 is provided with the spring 26 connected to the pawl at 27 and to the casing member 4 at 28, which assists the spring 20 in normally retaining the arms 9 and 10 in the position shown. It is obvious, however, that either of the springs 20 and 26 would be sufficient if made of the required strength.

Secured to the casing member 4 by the stud bolt 5 and nut 29 is the cross bar 30 which engages with the base 31 bolted to the end sheet 32 of the car 33, the cross bar being shown merely as a means of detachably securing the housing to the car, so that it may be mounted on either end of a car that is not turned at the end of a trip.

Within the winding drum 6 is a coil spring 34 connecting the drum and the stud bolt 5, and this spring is so mounted as to oppose the unwinding of the rope 24 and always has a tendency to wind the rope upon the drum.

The rope may be withdrawn from the casing members 1 and 4 by a steady pull and as the pull on the rope is relaxed the spring 34 will rewind the rope on the drum, but any sudden pull or jerk of the rope will throw the pulley 15 and arms 9 and 10 toward the side 35 of the casing members 1 and 4 and lift the ratchet pawl 18 by the connecting bar 16 so that it will engage the ratchet teeth 8 and instantly prevent further unwinding of the rope 24.

The rope is attached to the trolley pole 36, and as the pole plays upwardly and downwardly by the uneven height of the usual trolley wire the rope 24 will be maintained taut by the spring 34, but when the trolley leaves the usual trolley wire and starts upwardly with a sudden acceleration of speed the ratchet pawl 18 will engage the teeth 8 and instantly prevent further upward movement of the trolley, this preventing the trolley from being broken or torn from the car, and preventing injury to the usual overhead wiring.

What I claim as new and desire to secure by Letters Patent, is:—

1. In a trolley rope safety clutch, a revolubly mounted drum, a casing around said drum, a rope wound on said drum and leading therefrom, an opening in said casing and forming a guide around said rope adjacent said drum, an arm pivotally mounted in said casing between said drum and said opening, a pulley journaled in said arm and bearing against said rope, said arm extending toward the center of said drum and alongside thereof, a ratchet pawl connected to said arm, and a ratchet wheel rigid with said drum so that a sudden pull on said rope will, through said pulley and said arm, throw said pawl into engagement with said ratchet wheel.

2. In a trolley rope safety clutch, a casing, a drum revolubly mounted within said casing, an annular flange on said drum, internal ratchet teeth rigid with said flange, said casing provided with a radially extending hollow portion open at the outer end thereof, a rope passing through said extending hollow portion and wound around said drum, a spring within said drum to wind said rope on said drum, an arm pivotally connected to said casing within said extending hollow portion, a ratchet pawl pivotally mounted in said casing adjacent said ratchet teeth, and said arm and said ratchet pawl pivotally connected so that a sudden pull on said rope will operate said arm and engage said ratchet pawl with said ratchet teeth.

WILLIAM B. HASKINS.